United States Patent
Amber

(10) Patent No.: US 9,615,662 B1
(45) Date of Patent: Apr. 11, 2017

(54) FURNITURE SLIDE ASSEMBLY

(71) Applicant: John L. Amber, Delray Beach, FL (US)

(72) Inventor: John L. Amber, Delray Beach, FL (US)

( * ) Notice: Subject to any disclaimer, the term of this patent is extended or adjusted under 35 U.S.C. 154(b) by 0 days.

(21) Appl. No.: 14/965,166

(22) Filed: Dec. 10, 2015

Related U.S. Application Data

(63) Continuation-in-part of application No. 14/531,265, filed on Nov. 3, 2014, now Pat. No. 9,237,807.

(51) Int. Cl.
*A47B 91/06* (2006.01)
*F16B 2/08* (2006.01)
*F16B 1/00* (2006.01)

(52) U.S. Cl.
CPC ........... *A47B 91/06* (2013.01); *F16B 1/00* (2013.01); *F16B 2/08* (2013.01); *F16B 2001/0028* (2013.01); *Y10T 16/209* (2015.01)

(58) Field of Classification Search
CPC . Y10T 16/191; Y10T 16/1937; Y10T 16/209; Y10T 16/21; A47B 91/06; A47B 91/12; A47C 7/002; F16B 2/06; F16B 2/08; F16B 1/00; F16B 2001/0028
USPC .... 16/30, 33, 42 R, 42 T; 248/188.9, 346.11
See application file for complete search history.

(56) References Cited

U.S. PATENT DOCUMENTS

| | | | | |
|---|---|---|---|---|
| 766,210 A * | 8/1904 | Young, Jr. et al. | .... | A47C 7/002 16/42 R |
| 779,402 A * | 1/1905 | Abrams | ................ | A47G 23/03 16/42 R |
| 887,663 A * | 5/1908 | Lee | ......................... | A47C 7/002 16/42 R |
| 909,827 A * | 1/1909 | Seibert | ................. | A61H 3/0288 135/84 |
| 1,066,381 A * | 7/1913 | Daniel | ................... | A47G 23/03 248/346.11 |
| 1,563,700 A * | 12/1925 | Frankenstein | ............ | E06C 7/46 182/111 |
| 2,107,629 A * | 2/1938 | Dallas | .................... | A47B 91/02 16/19 |
| 2,890,824 A * | 6/1959 | Derby | ....................... | E06C 7/44 182/202 |
| 2,935,813 A * | 5/1960 | Berman | ................. | A47B 91/02 182/204 |
| 3,191,212 A * | 6/1965 | Hahn | ................... | A47B 91/066 16/42 R |

(Continued)

*Primary Examiner* — William Miller
(74) *Attorney, Agent, or Firm* — Glenn E. Gold; Glenn E. Gold, P.A.

(57) ABSTRACT

A furniture slide assembly, selectively attachable to a leg of an article of furniture, includes a slide body, intermediate and upper securement assemblies, and a plurality of elongated support rods extending therebetween and interconnecting them together. The slide body receives and supports the furniture leg at a first location on the leg and provides slidable contact on a support surface. The intermediate securement assembly, being an elongated strap with lugs and an aperture on its respective opposite end portions, detachably attaches about the furniture leg at a second location on the leg spaced above the first location. The upper securement assembly, being an elongated strap with loop and hook segments on its respective opposite end portions, detachably attaches about the furniture leg at a third location on the leg spaced above the second location.

20 Claims, 9 Drawing Sheets

(56) References Cited

U.S. PATENT DOCUMENTS

| | | | | |
|---|---|---|---|---|
| 4,117,999 A * | 10/1978 | Gessler | .................. | A47B 91/02 |
| | | | | 248/188.2 |
| 4,138,763 A * | 2/1979 | Cooley | ............... | B60B 33/0089 |
| | | | | 16/18 R |
| 5,069,102 A * | 12/1991 | Wolf | ...................... | G10D 3/003 |
| | | | | 248/188.9 |
| 5,727,284 A * | 3/1998 | Deutsch | ............... | A47B 91/002 |
| | | | | 16/18 R |
| 5,983,452 A * | 11/1999 | McGovern | .............. | B60B 33/00 |
| | | | | 16/18 B |
| 7,124,986 B1 * | 10/2006 | Bailey | .................... | A47B 91/12 |
| | | | | 16/42 R |
| 7,162,772 B2 * | 1/2007 | Asher | .................. | B60B 33/0002 |
| | | | | 16/29 |
| 7,757,346 B2 * | 7/2010 | Chase | .................... | A47B 91/06 |
| | | | | 16/42 R |
| 8,726,463 B2 * | 5/2014 | Bushey | .................. | A47B 91/06 |
| | | | | 16/42 R |
| 2008/0244870 A1 * | 10/2008 | Chase | .................... | A47B 91/06 |
| | | | | 16/42 R |

* cited by examiner

FURNITURE SLIDE ASSEMBLY

CROSS-REFERENCE(S) TO RELATED APPLICATION(S)

This U.S. non-provisional patent application is a continuation-in-part application which claims the benefit of co-pending parent U.S. non-provisional patent application Ser. No. 14/531,265, having a filing date of Nov. 3, 2014, is incorporated-by-reference herein in its entirety.

FIELD OF THE INVENTION

The present disclosure generally relates to apparatuses and methods for moving furniture. More particularly, the present disclosure relates to a furniture slider attachable to a leg of the furniture to reduce the friction of sliding the furniture across the surface of a floor.

BACKGROUND OF THE INVENTION

The vast majority of people have their own unique space which they call home. Home may be a house which they own or rent, a condominium or an apartment. The interior of one's home contains many objects such as wall decorations and furniture to make the home comfortable and personalized to an individual's taste. In the course of living in the home over a period of time, most individuals also prefer some variety to keep the interior from becoming boring. While wall decorations such as pictures and knickknacks can readily be interchanged with other similar objects, the basic items of furniture did not have that flexibility. Furniture objects such as sofas, upholstered chairs, tables, and the like cannot be readily exchanged for other pieces of furniture due to cost and size limitations. However, the articles of furniture, as a result of being freestanding within a room, do lend themselves to be rearranged to present a degree of variety.

When rearranging or moving furniture, often more than one individual are required to accomplish the task because of the bulk and the weight of the articles of furniture. Consequently, some individuals may install casters on the legs to facilitate moving the furniture articles without needing to draft the services of another individual. However, casters are typically permanently affixed to the legs of the furniture and if resting on a hard surface will tend to move as a result of daily use requiring constant adjustment of the furniture placement. Alternatively, if the article of furniture rests upon a carpeted floor, the casters may not readily roll across the floor depending on the depth of the carpet pile. Therefore, casters have significant disadvantages and are not practical in a residential setting.

Another solution has been the temporary use of sliders solely for the purpose of moving the furniture over a short distance by placing the slider under each of the legs of the article of furniture and then removing the slider once the article of furniture has been repositioned. These sliders are typically comprised of a body having a depression in an upper surface and also having a bottom surface that has a relatively low coefficient of friction with the floor surface. With a slider placed under each leg the article of furniture can be pushed with minimal force to its desired placement at which time the sliders are then removed. However, if during movement of the article of furniture a corner of the furniture is raised or encounters a small obstacle, the furniture leg can become dislodged from the slider and impact the floor surface resulting in scratches to the floor, possible tearing of carpet, or damage to the furniture leg.

Therefore, a furniture slider is needed that can be temporarily secured to the leg of an article of furniture for the purpose of moving the article of furniture over a floor surface wherein the furniture slider will not become dislodged if the leg is raised or if the furniture slider encounters an obstacle on the floor.

SUMMARY OF THE INVENTION

The present disclosure is generally directed to a furniture slide assembly that is selectively attachable to a leg of an article of furniture. The furniture slide assembly includes a slide body supporting thereabove an intermediate securement assembly and an upper securement assembly for securing the leg of the article of furniture to the furniture slide assembly.

In an aspect of the present invention, the furniture slide assembly includes:
  a slide body including
    an upper side for receiving and supporting a leg of an article of furniture at a first location on the leg, and
    a bottom side made of a material having a substantially low coefficient of friction for providing slidable contact on a support surface;
  an intermediate securement assembly detachably attachable about the leg of the article of furniture at a second location on the leg spaced above the first location;
  an upper securement assembly detachably attachable about the leg of the article of furniture at a third location on the leg spaced above the second location; and
  at least one elongated support rod mounted to the slide body and extending between, and interconnecting together, the slide body, the intermediate securement assembly and the upper securement assembly.

In another aspect, the slide body of the furniture slide assembly at a peripheral location has a tab with an aperture therethrough for attaching an elongated member to the slide body to facilitate towing the furniture slide assembly by the elongated member.

In another aspect, the slide body of the furniture slide assembly at the upper side defines a central depression for receiving the leg of the article of furniture at the first location on the leg, the central depression having a plurality of non-skid segments for engaging the leg of the article of furniture at the first location on the leg.

In another aspect, the at least one elongated support rod of the furniture slide assembly is a plurality of elongated support rods supported by and extending upright from the slide body proximate the first location on the leg of the article of furniture, the plurality of elongated support rods also supporting the intermediate securement assembly and the upper securement assembly respectively proximate the second location and the third location on the leg of the article of furniture.

In another aspect, the furniture slide assembly includes:
  a slide body including
    an upper side for receiving and supporting a leg of an article of furniture at a first location on the leg, and
    a bottom side made of a material having a substantially low coefficient of friction for providing slidable contact on a support surface;
  an intermediate securement assembly detachably attachable about the leg of the article of furniture at a second location on the leg spaced above the first location;

an upper securement assembly detachably attachable about the leg of the article of furniture at a third location on the leg spaced above the second location; and a plurality of elongated support rods supported by and extending upright from the slide body proximate the first location on the leg of the article of furniture, the plurality of elongated support rods also supporting the intermediate securement assembly and the upper securement assembly respectively proximate the second location and the third location on the leg of the article of furniture, the intermediate securement assembly including a plurality of collars having respective passageways receiving therethrough the elongated support rods for adjustable placement of the intermediate securement assembly along the elongated support rods.

In another aspect, the intermediate securement assembly of the furniture slide assembly includes:

an elongated flexible strap having opposing first and second end portions extendible in opposite directions about the leg of the article of furniture at the second location; and first and second attachment devices respectively on the opposing first and second end portions of the elongated flexible strap and being interengageable with one another to detachably attach the opposing first and second end portions of the elongated flexible strap snugly about the leg at the second location.

In another aspect, the first attachment device on the first end portion of the elongated flexible strap of the intermediate securement assembly includes a plurality of lugs extending laterally therefrom and spaced apart from one another therealong. The second attachment device on the second end portion of the elongated flexible strap of the intermediate securement assembly includes an aperture sized to receive the flexible strap first end portion therethrough and detachably attach with at least one of the lugs.

In another aspect, the furniture slide assembly includes:
a slide body including
an upper side for receiving and supporting a leg of an article of furniture at a first location on the leg, and
a bottom side made of a material having a substantially low coefficient of friction for providing slidable contact on a support surface;
an intermediate securement assembly detachably attachable about the leg of the article of furniture at a second location on the leg spaced above the first location;
an upper securement assembly detachably attachable about the leg of the article of furniture at a third location on the leg spaced above the second location; and
a plurality of elongated support rods supported by and extending upright from the slide body proximate the first location on the leg of the article of furniture, the plurality of elongated support rods also supporting the intermediate securement assembly and the upper securement assembly respectively proximate the second location and the third location on the leg of the article of furniture, the upper securement assembly including a plurality of brackets having respective passageways receiving therethrough the elongated support rods for predetermined placement of the upper securement assembly along the elongated support rods.

In another aspect, the upper securement assembly of the furniture slide assembly includes:

an elongated flexible strap having opposing first and second end portions extendible in opposite directions about the leg of the article of furniture at the second location; and first and second attachment devices respectively on the opposing first and second end portions of the elongated flexible strap and being interengageable with one another to detachably attach the opposing first and second end portions of the elongated flexible strap snugly about the leg at the third location.

In another aspect, the first attachment device on the first end portion of the elongated flexible strap of the upper securement assembly includes a length of loop segment of a hook and loop fastener. The second attachment device on the second end portion of the elongated flexible strap of the upper securement assembly includes a length of hook segment of a hook and loop fastener.

These and other features, aspects, and advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

In one exemplary implementation of the invention of the cross-referenced parent application, a furniture slide assembly 100 is shown in FIGS. 1 through 7 illustrating its various components wherein a slide body assembly 110 supports thereabove a clamp assembly 130 for securing a leg of an article of furniture (not shown) to the furniture slide assembly 100.

Figure 2:
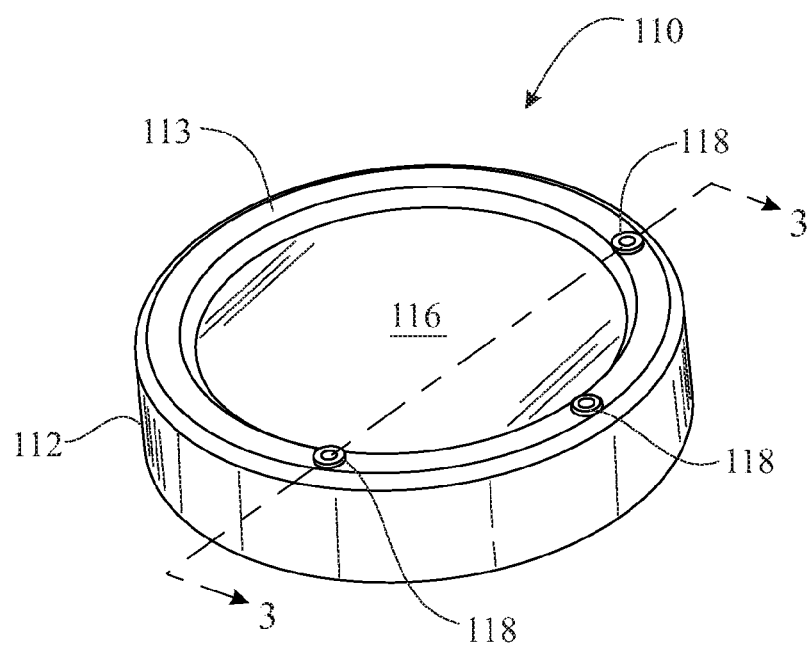
FIG. 2 presents a top isometric view of the slide body assembly of the furniture slide assembly originally introduced in FIG. 1.
Figure 3:
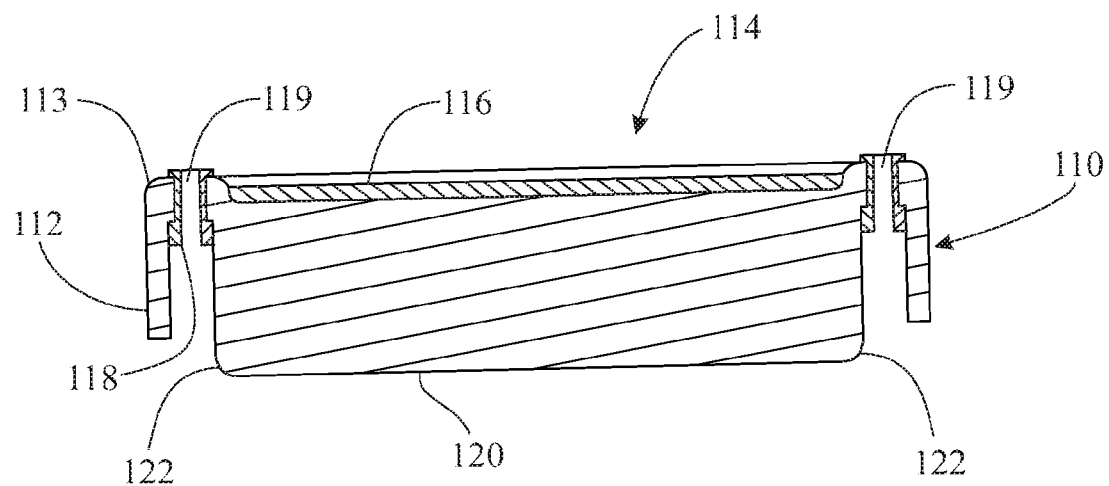
FIG. 3 presents a cross-sectional view of the slide body assembly taken along the section line 3-3 of FIG. 2.

As illustrated in FIGS. 2 and 3, the slide body assembly 110 comprises a slide body 112 which is typically fabricated of a moldable resin wherein the resin exhibits a low coefficient of friction with respect to a floor surface such as carpeting. However, the slide body 112 is also alternatively contemplated to be molded of other materials wherein a layer of low coefficient of friction material is applied to the bottom surface 120. In the illustrated configuration, the slide body 112 is formed as a circular disk wherein the periphery of the bottom exhibits a radiused edge 122 to facilitate easy movement across the floor surface. The top of the slide body 112 includes a raised rim 113 which defines a central depression 114 in the central portion of the slide body 112. The central depression 114 is for receiving the bottom of the leg of the article of furniture to be moved. In the illustrated configuration of the slide body 112, the central depression 114 includes a non-skid layer 116 to facilitate the immobilization of the furniture leg resting thereon.

Figure 1:
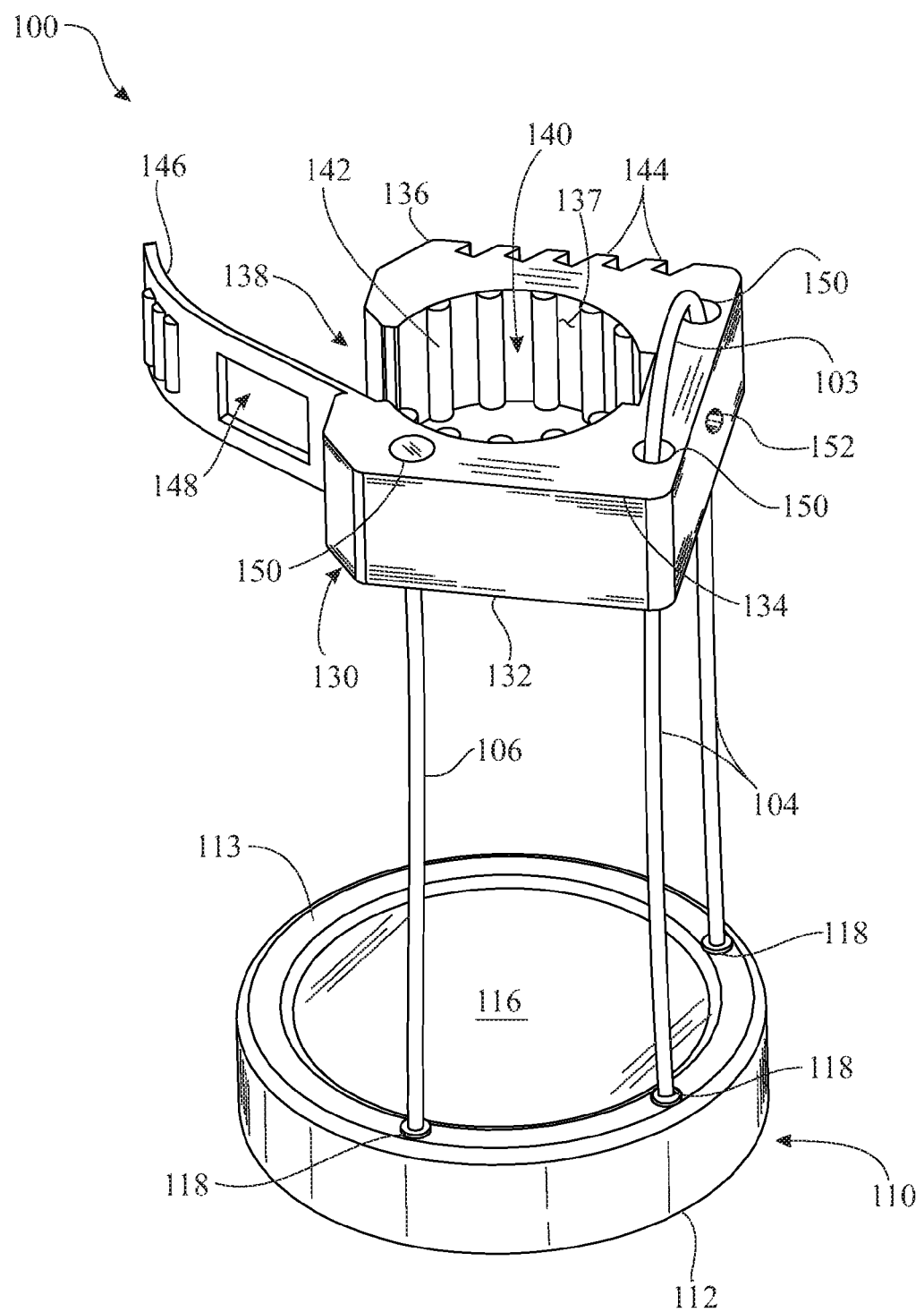
FIG. 1 presents a top isometric view of an exemplary implementation of a furniture slide assembly embodying the invention of the parent application cross-referenced above, wherein the furniture slide assembly has a leg clamp supported above a slide body assembly.

The slide body 112 also includes a plurality of support inserts 118 internally retained about the periphery of the slide body 112, and most preferably in the raised rim 113 thereof. The support inserts 118 are preferably fabricated from a resilient material to facilitate a frictional retention within the raised rim 113 of the slide body 112. Each of the support inserts 118 defines an aperture 119, wherein each aperture 119 closely receives a support rod 104, 106 (FIG. 1). The support rods can be linear such as the support rod 106 or can be formed as an inverted "U" 103 with each rod leg 104 engaging a support insert 118.

Figure 4:
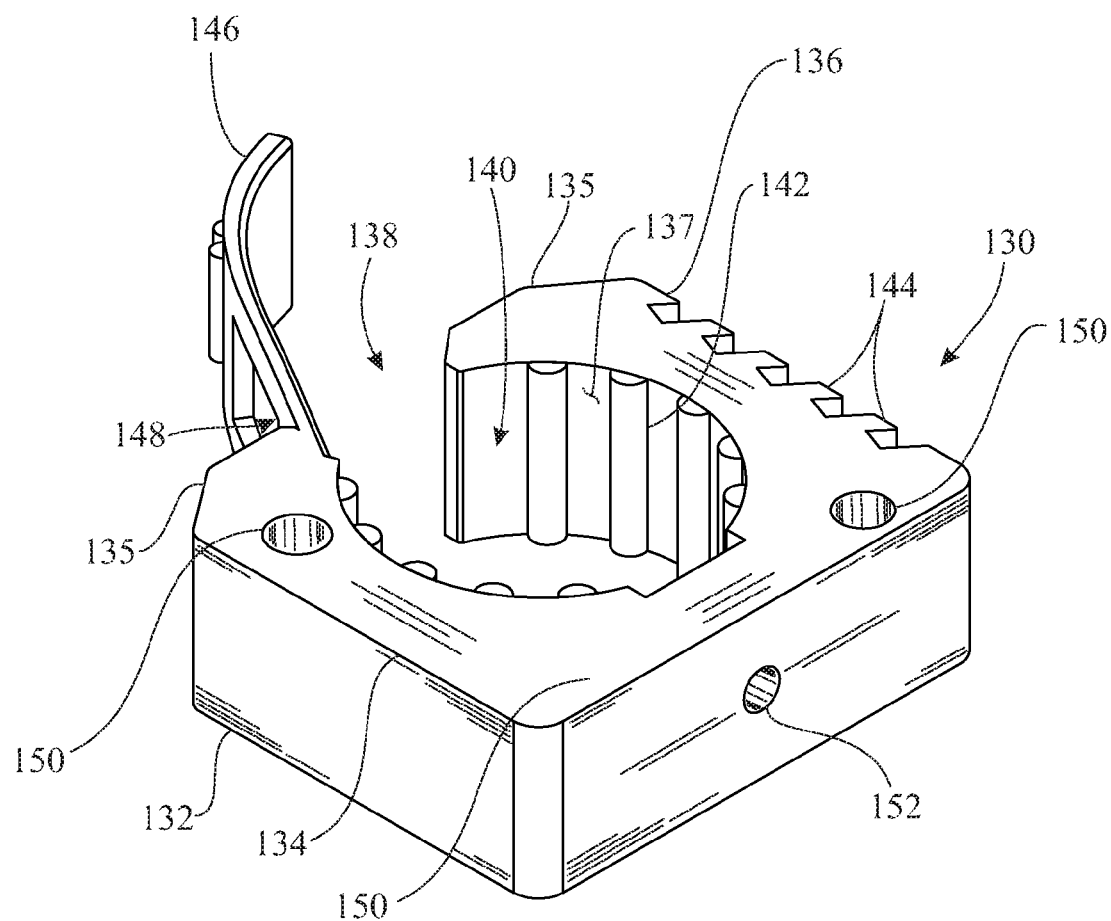
FIG. 4 presents a top isometric view of the clamp assembly of the furniture slide assembly originally introduced in FIG. 1.

As best shown in FIG. 4, the clamp assembly 130 includes a clamp body 132 preferably molded of a resilient material such as rubber or other similar material. The clamp body 132 includes a first arm 134 and an opposing second arm 136 which in combination with the body 132 have an internal surface 137 defining a receiving aperture 140 therein. The internal surface 137 defining the receiving aperture 140 can also include a plurality of resilient ridges 142 extending away from the internal surface 137 into the receiving aperture 140. The resilient ridges 142 can aid in gripping a furniture leg received in the receiving aperture 140. The distal ends 135 of the first and second arms 134, 136 respectively define an opening 138 through which the leg of an article of furniture can be laterally translated and be received in the receiving aperture 140.

The second arm 136 includes, on an exterior surface thereof, a plurality of spaced apart lugs 144 extending laterally outwardly therefrom. The first arm 134 at its distal end 135 has a clamp arm 146 affixed thereto. Clamp arm 146 further defines an arm aperture 148 which is sized to receive at least one of the lugs 144 extending from second arm 136. When a leg of an article of furniture is received in receiving aperture 140, the resilient arms 134, 136 can be flexed toward one another so as to securely engage the furniture leg, and the clamp arm 146 can be translated to engage one of the lugs 144 within the arm aperture 148 to secure the clamp assembly about the furniture leg.

The clamp body 132 also defines a plurality of support rod apertures 150 extending therethrough and substantially corresponding in placement with, and each receiving therethrough, one of the support rods 104, 106. When an inverted "U" 103 is utilized, the support legs 104 are received in adjacent support rod apertures 150 and the apex of the "U" functions as a stop to limit the uppermost vertical adjustment of the clamp assembly 130.

Figure 5:
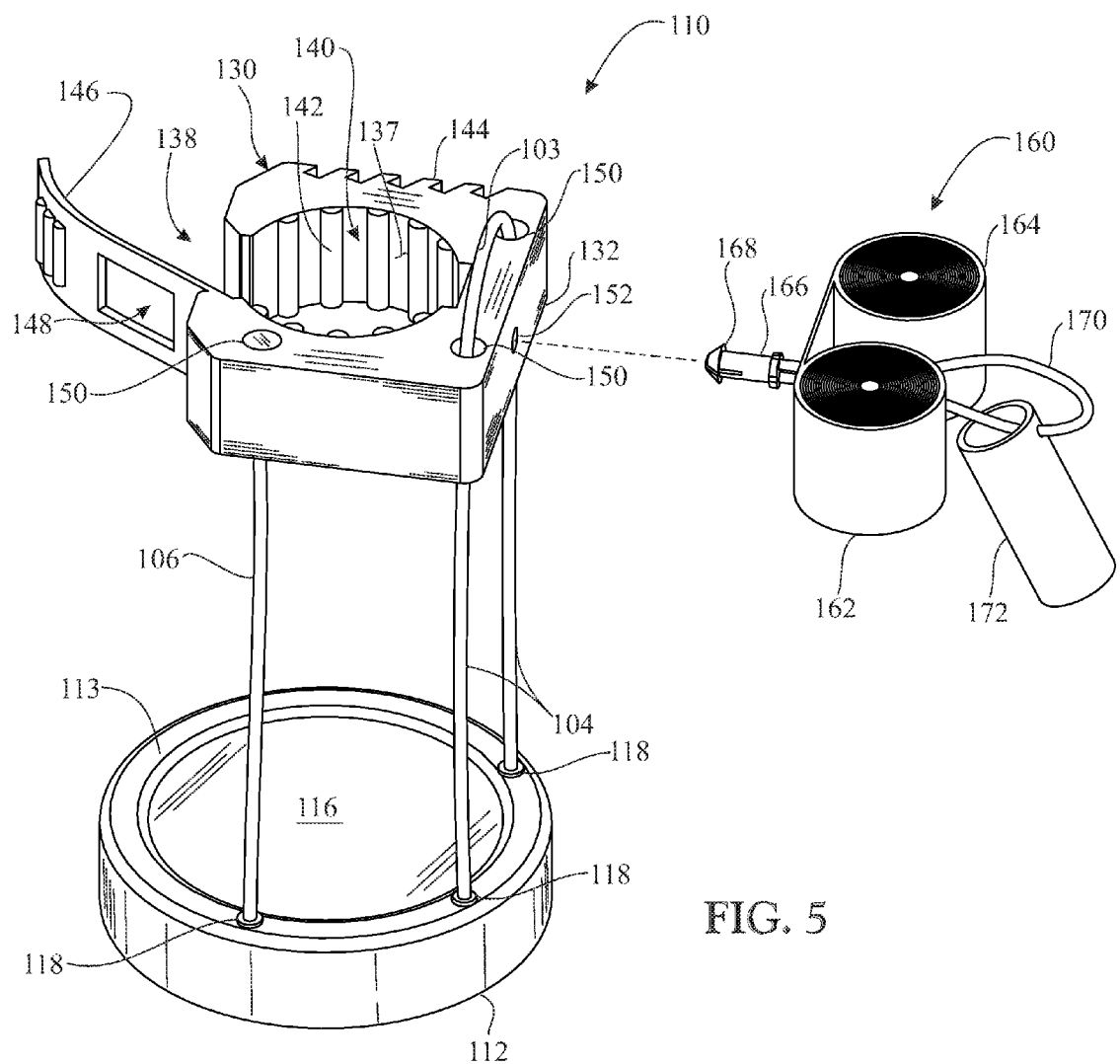
FIG. 5 presents a top isometric view of the furniture slide assembly showing the addition of a securement assembly.
Figure 6:
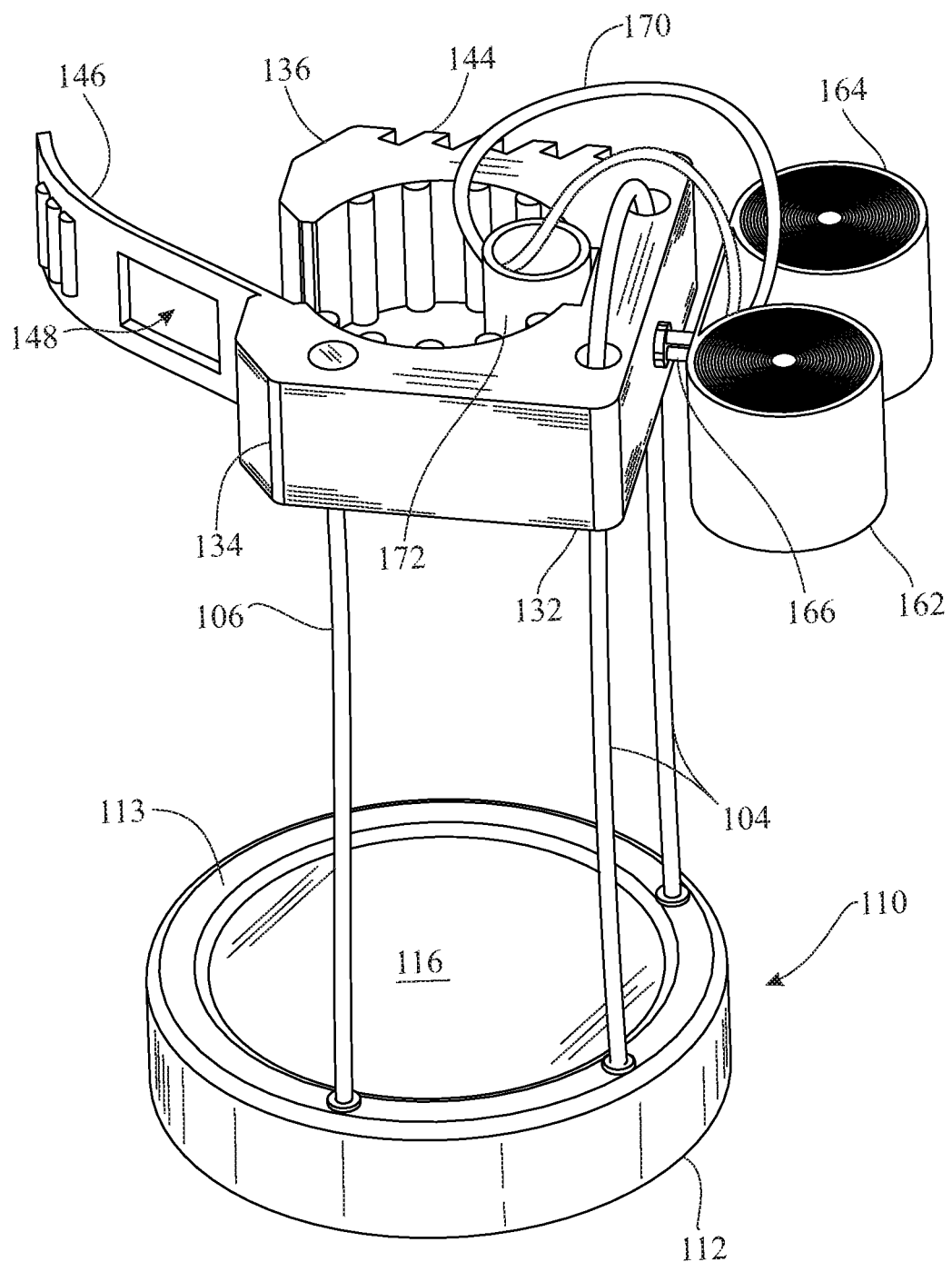
FIG. 6 presents a top isometric view of the furniture slide assembly illustrating the placement of a tubular spacer in a receiving aperture of the clamp assembly.
Figure 7:
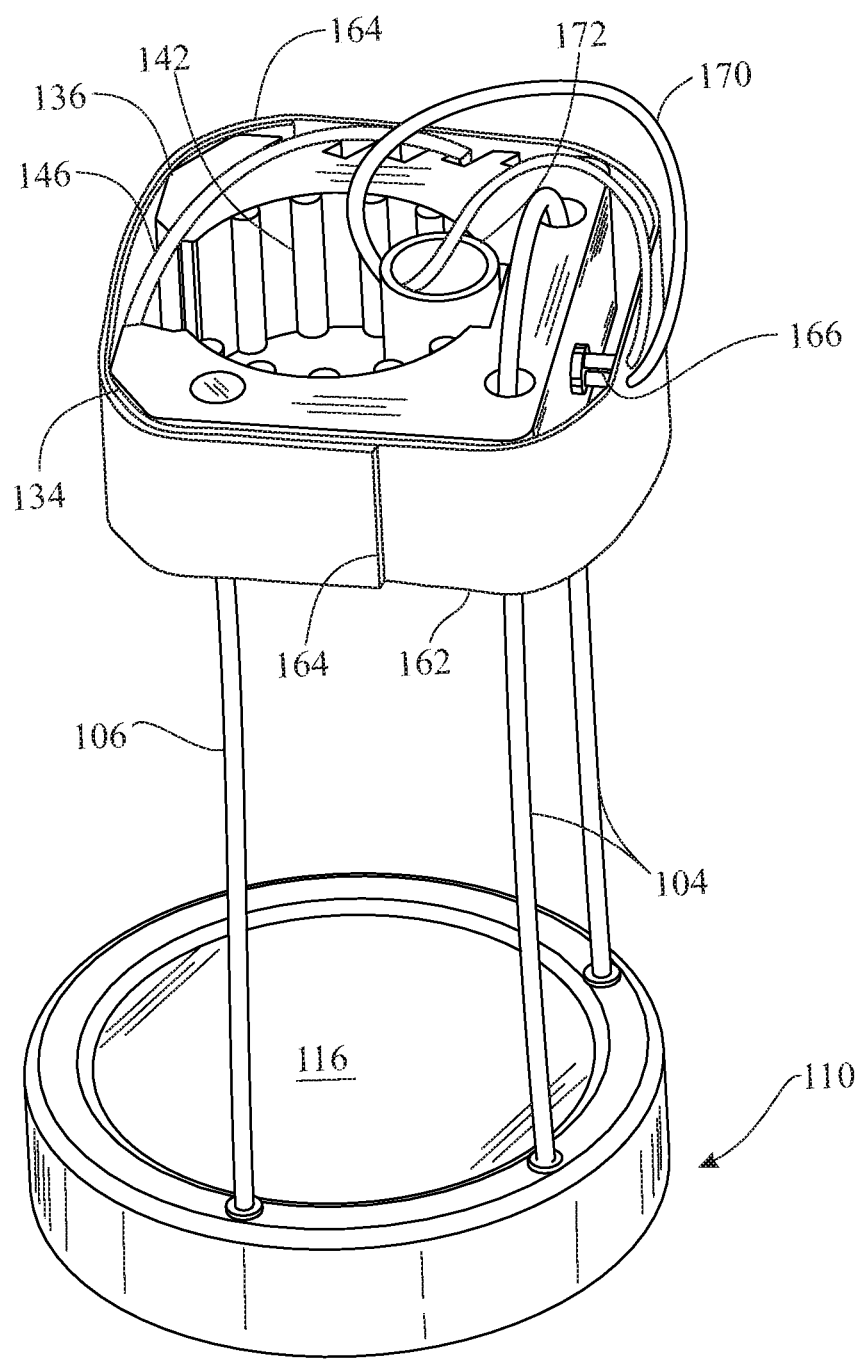
FIG. 7 presents a top isometric view of the furniture slide assembly wherein a hook and loop fastener is secured about the clamp assembly.

As illustrated in FIGS. 5-7, clamp body 132 can also define an aperture 152 therein which is most preferably positioned opposite from opening 138. A securement assembly 160 includes a pin 166 having a locking head 168 which is inserted into aperture 152 to secure the securement assembly 160 to the clamp assembly 130. Securement assembly 160 includes a loop segment 162 of a hook and loop fastener wherein the loop segment 162 is positioned to extend about a periphery of the clamp assembly 130 in a first direction. The securement assembly 160 further includes a hook segment 164 of a hook and loop fastener and is positioned to extend about a periphery of the clamp assembly 130 in a second opposing direction. In this manner, once the leg of an article of furniture is received in the clamp assembly 130 and the clamp arm 146 has engaged one of the lugs 144, the hook and loop segments 164, 162 respectively can be extended about the periphery of the clamp 130 in opposing directions and engaged one with the other to prevent the accidental disengagement of the clamp arm 146 from the engaged lug 144 during movement of the article of furniture.

The securement assembly 160 further includes a spacer 172 and a lanyard 170 to which the spacer 172 is affixed and of sufficient length to permit the insertion of the spacer 172 in the receiving aperture 140 of the clamp assembly 130. In the illustrated embodiment, the spacer is a tubular segment of molded resin. In use, when the leg of an article of furniture is of a size smaller than the receiving aperture 140 the spacer 172 may be inserted into the receiving aperture 140 to permit the interior surface 137 and the ridges 142 to be clamped in engaging contact with the furniture leg.

In use, a plurality of furniture slide assemblies 100 are arranged such that one slide assembly 100 is positioned with each leg of an article of furniture to be moved. The clamp assembly 130 is vertically adjusted along the length of support rods 104, 106 to place the clamp assembly at a proper height to engage the furniture leg. The leg of the article of furniture is raised slightly, and the slide assembly 100 is translated to place the slide body 112 under the furniture leg such that the furniture leg rests upon the non-skid surface 116. The leg is inserted through the opening 138 of the clamp assembly 130 until it is fully received in the receiving aperture 140. The first and second arms 134, 136 of the clamp assembly 130 are urged one toward the other so that the furniture leg is firmly grasped by the interior surface 137 and the ridges 142 defining the receiving aperture 140 concurrently as the clamp arm 146 is positioned to engage at least one of the lugs 144 extending laterally from the second arm 136 in the arm aperture 148 of the clamp arm 146. Then, if desired, the loop segment 162 of the hook and loop fastener of the securement assembly 160 is extended about the periphery of the clamp assembly 130 in a first direction, and the hook segment 164 is extended about the clamp assembly periphery in an opposite direction for engagement with the loop segment 162 thereby securing the clamp assembly 130 about the leg of the furniture article. If the leg of the furniture article is too small to be securely grasped by the clamp assembly 130 the spacer 172 of the securement assembly 160 can be placed in the receiving aperture 140 abutting the furniture leg to act as a filler to permit secure grasping of the furniture leg by the clamp assembly 130. The procedure is repeated for each leg of the article of furniture whereupon the article of furniture can then be translated over the floor surface as a result of the minimal friction of the bottom surface of the slide body 112. Once the furniture article has been placed, the slide assemblies 100 can be removed from each furniture leg by reversing the above procedure.

Figure 8:
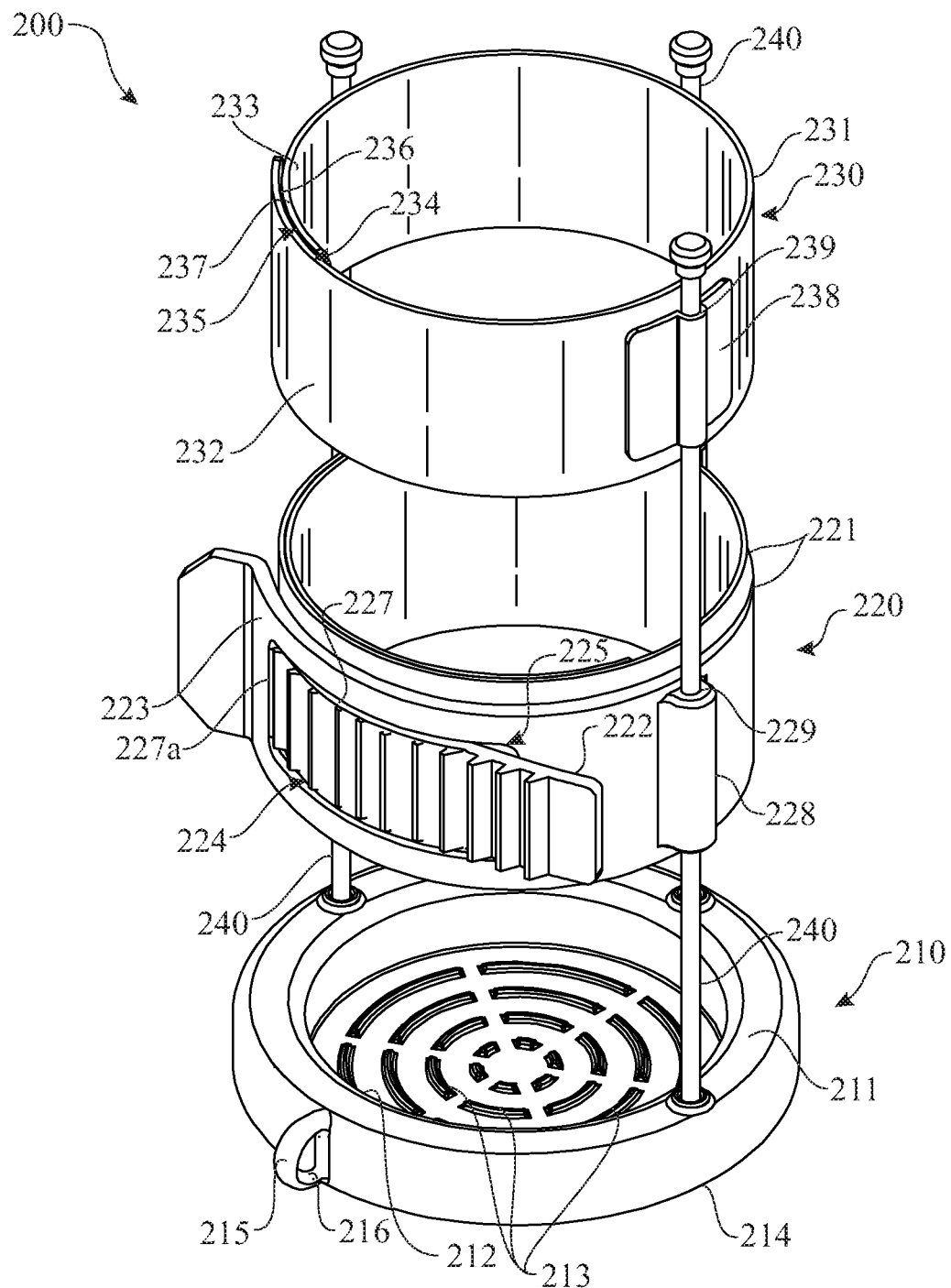
FIG. 8 presents a top isometric view of an exemplary implementation of a furniture slide assembly embodying the present invention.
Figure 9:
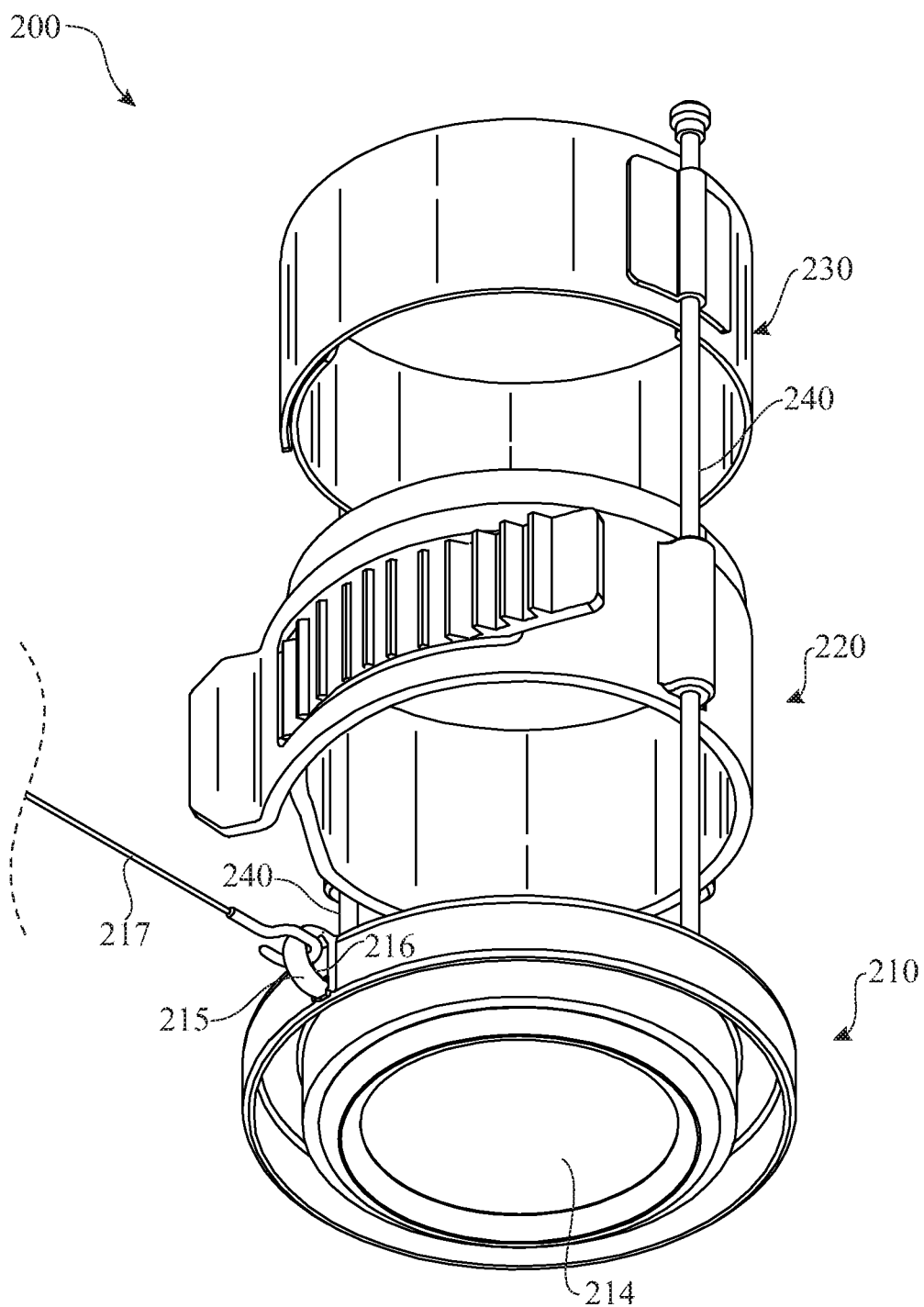
FIG. 9 presents a bottom isometric view of the furniture slide assembly originally introduced in FIG. 8.
Figure 10:
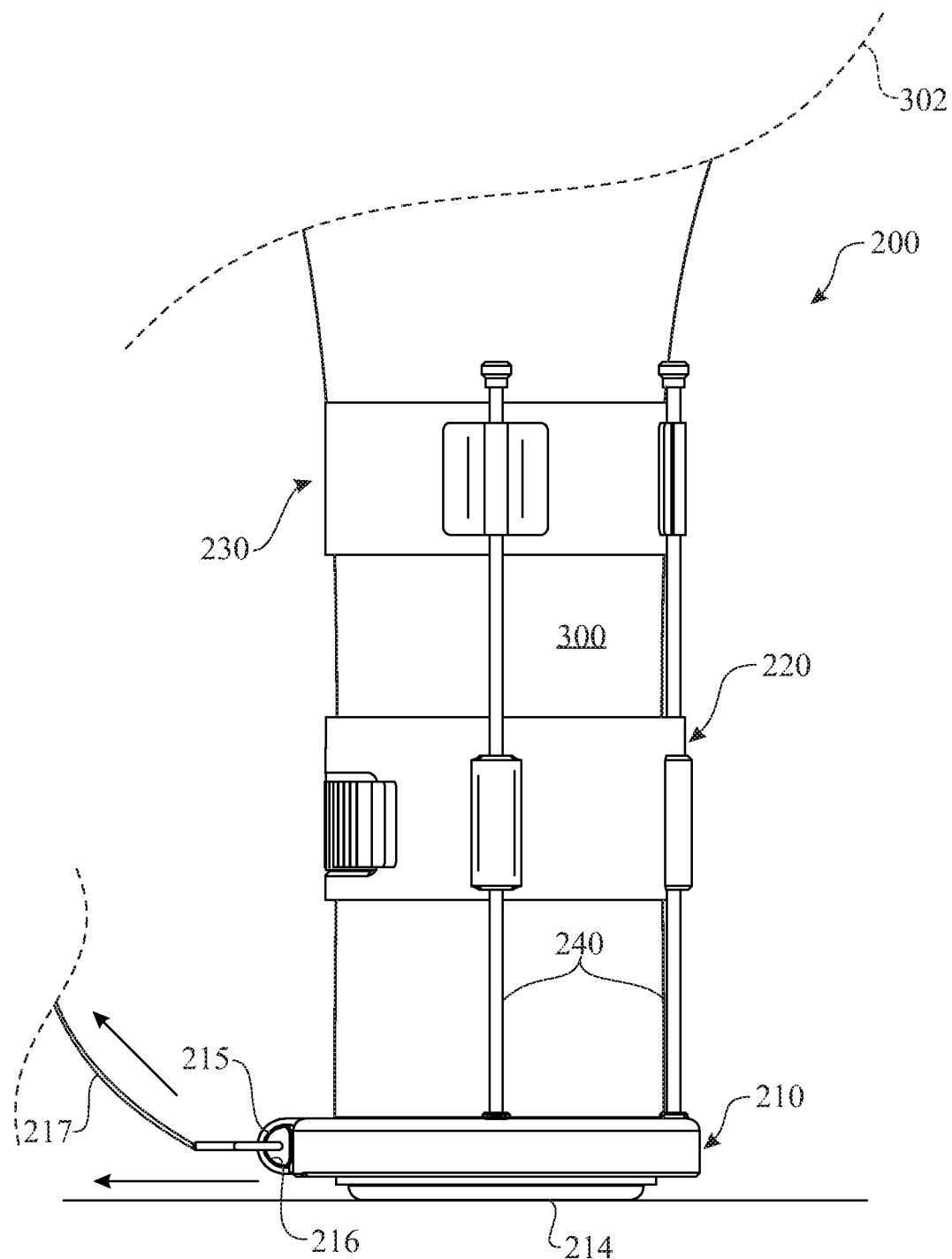
FIG. 10 presents a side elevation view of the furniture slide assembly originally introduced in FIG. 8, shown applied to a leg of an article of furniture.

In an exemplary implementation of the present invention, a furniture slide assembly 200 is shown in FIGS. 8 through 10 illustrating its various components wherein a slide body 210 supports thereabove an intermediate securement assembly 220 and an upper securement assembly 230 for securing a leg 300 of an article of furniture 302 to the furniture slide assembly 200. Also, at least one and preferably a plurality of elongated support rods 240 are mounted to the slide body 210 and extend between, and interconnect together, the slide body 210, the intermediate securement assembly 220 and the upper securement assembly 230.

More particularly, the slide body 210 of the furniture slide assembly 200, being substantially similar to the slide body 112 of the FIGS. 1-3, has an upper side 211 that receives and supports the furniture leg 300 at a first location thereon, usually at the bottom end of the leg. The slide body 210 at its upper side 211 defines a central recess or depression 212 for receiving the bottom end of the furniture leg 300. The slide body 210 also has a plurality of non-skid raised segments 213, such as a rubber cushion elements in the formation of concentric circles, on its upper side 211 in the central depression 212 that engage the bottom end of the furniture leg 300 and inhibit movement relative to the slide body 210. The slide body 210 also has a bottom side 214 made of a suitable material having a substantially low coefficient of friction so as to provide slidable contact on a support surface S, as seen in FIG. 10. To facilitate moving the article of furniture 302, the slide body 210 further has at a peripheral location a tab 215, attached to the slide body 210 and projecting radially outward therefrom, and an aperture 216 formed through the tab 215. The tab 215 enables attaching thereto an elongated member 217, such as by way of example but not limitation a flexible line in the form of a cord or rope, to facilitate towing the furniture slide assembly 200 by the elongated member 217 connected to its slide body 210.

The intermediate securement assembly 220 of the furniture slide assembly 200 is detachably attachable about the furniture leg 300 at a second, intermediate location thereon spaced above the above-described first location. The intermediate securement assembly 220 includes an elongated flexible strap 221 made of a suitable elastic material, such as by way of example but not limitation a suitable rubber, having opposing first and second end portions 222, 223 extendible in opposite directions about the furniture leg 300 at the second, intermediate location. The intermediate securement assembly 220 also includes first and second attachment devices 224, 225 respectively on the opposing first and second end portions 222, 223 of the elongated flexible strap 221. The first attachment device 224 on the first end portion 222 of the elongated flexible strap 221 may take the form of a plurality of lugs 226 extending laterally from the flexible strap first end portion 222 and being spaced apart from one another therealong. The second attachment device 225 on the second end portion 223 of the elongated flexible strap 221 may take the form of an aperture 227 sized to receive therethrough the flexible strap first end portion 223 and detachably attach at an end edge 227a of the aperture 227 with at least one of lugs 226. The first and second attachment devices 224, 225 having these forms are interengageable with one another so as to detachably attach the opposing first and second end portions 222, 223 of the elongated flexible strap 221 snugly about the furniture leg 300 at the second, intermediate location. The intermediate securement assembly 220 further includes a plurality of collars 228 attached on the exterior surface of the elongated flexible strap 221 and protruding outwardly therefrom at spaced locations therealong aligned with the plurality of elongated support rods 240. The collars 228 have respective passageways 229 that receive therethrough the elongated support rods 240 for adjustable slidable placement of the intermediate securement assembly 220 along the elongated support rods 240.

The upper securement assembly 230 of the furniture slide assembly 200 is detachably attachable about the furniture leg 300 at a third location thereon spaced above the above-described second, intermediate location. The upper securement assembly 230 includes an elongated flexible strap 231 made of a suitable elastic material, such as by way of example but not limitation a suitable rubber, having opposing first and second end portions 232, 233 extendible in opposite directions about the furniture leg 300 at the third location. The upper securement assembly 230 also includes first and second attachment devices 234, 235 respectively on the opposing first and second end portions 232, 233 of the elongated flexible strap 231. The first attachment device 234 on the first end portion 232 of the elongated flexible strap 231 may take the form of a length of loop segment 236 of a hook and loop fastener. The second attachment device 235 on the second end portion 233 of the elongated flexible strap 231 may take the form of a length of hook segment 237 of a hook and loop fastener. The first and second attachment devices 234, 235 having these forms are interengageable with one another so as to detachably attach the opposing first and second end portions 232, 233 of the elongated flexible strap 231 snugly about the furniture leg 300 at the third location. The upper securement assembly 230 and protruding outwardly therefrom further includes a plurality of brackets 238 attached on the exterior surface of the elongated flexible strap 231 at spaced locations therealong aligned with the plurality of elongated support rods 240. The brackets 238 have respective passageways 239 that receive therethrough the elongated support rods 240 for placement of the upper securement assembly 230 at a predetermined upper location along the elongated support rods 240.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What I claim is:

1. A furniture slide assembly selectively attachable to a leg of an article of furniture for slidable contact on a floor surface, said furniture slide assembly comprising:
    a slide body including
        an upper side for receiving and supporting the leg of the article of furniture at a first location on the leg, and
        a bottom side made of a material having a substantially low coefficient of friction for providing slidable contact on the floor surface, wherein the bottom side of the slide body defines a lowermost surface of the furniture slide assembly;
    an intermediate securement assembly releasably attachable about the leg of the article of furniture at a second location on the leg spaced above the first location;
    an upper securement assembly spaced-apart from said intermediate securement assembly and said slide body, said upper securement assembly releasably attachable about the leg of the article of furniture at a third location on the leg spaced above the second location; and
    at least one elongated support rod mounted to said slide body and extending between, and interconnecting together, said slide body, said intermediate securement assembly and said upper securement assembly, said at least one elongated support rod also supported by and extending upright from said slide body proximate the first location on the leg of the article of furniture, said at least one elongated support rod also supporting said intermediate securement assembly and upper securement assembly respectively proximate the second location and the third location on the leg of the article of furniture.

2. The furniture slide assembly according to claim 1 wherein said slide body at a peripheral location has a tab with an aperture therethrough for attaching an elongated member to said slide body to facilitate towing said furniture slide assembly by the elongated member.

3. The furniture slide assembly according to claim 1 wherein said slide body at said upper side defines a central depression for receiving the leg of the article of furniture at the first location on the leg.

4. The furniture slide assembly according to claim 3 wherein said slide body at said upper side and in said central depression has a plurality of non-skid segments for engaging the leg of the article of furniture at the first location on the leg.

5. The furniture slide assembly according to claim 1 wherein said at least one elongated support rod further comprises a plurality of elongated support rods supported by and extending upright from said slide body proximate the first location on the leg of the article of furniture, said plurality of elongated support rods also supporting said intermediate securement assembly and upper securement assembly respectively proximate the second location and the third location on the leg of the article of furniture.

6. The furniture slide assembly according to claim 5 wherein at least one of said intermediate and upper securement assemblies is vertically adjustable along said elongated rods.

7. The furniture slide assembly according to claim 1 wherein at least one of said upper and intermediate securement assemblies includes:
    an elongated flexible strap having opposing first and second end portions extendible in opposite directions about the leg of the article of furniture at the respective one of the second and third locations; and
    first and second attachment devices respectively on said opposing first and second end portions of said elongated flexible strap and being interengageable with one another to detachably attach said opposing first and second end portions of said elongated flexible strap snugly about the leg at the respective one of the second and third locations.

8. The furniture slide assembly according to claim 7 wherein:
    said first attachment device on said first end portion of said elongated flexible strap includes a plurality of lugs extending laterally therefrom and spaced apart from one another therealong; and
    said second attachment device on said second end portion of said elongated flexible strap includes an aperture sized to receive said flexible strap first end portion therethrough and detachably attach with at least one of said lugs.

9. The furniture slide assembly according to claim 7 wherein:
    said first attachment device on said first end portion of said elongated flexible strap includes a length of loop segment of a hook and loop fastener; and
    said second attachment device on said second end portion of said elongated flexible strap includes a length of hook segment of a hook and loop fastener.

10. The furniture slide assembly according to claim 7 wherein said at least one of said upper and intermediate securement assemblies further includes one of at least one collar and at least one bracket having a respective passageway snugly receiving therethrough said at least one elongated support rod.

11. A furniture slide assembly selectively attachable to a leg of an article of furniture, said furniture slide assembly comprising:
    a slide body including
        an upper side for receiving and supporting the leg of the article of furniture at a first location on the leg, and
        a bottom side made of a material having a substantially low coefficient of friction for providing slidable contact on a support surface;
    an intermediate securement assembly detachably attachable about the leg of the article of furniture at a second location on the leg spaced above the first location;
    an upper securement assembly detachably attachable about the leg of the article of furniture at a third location on the leg spaced above the second location; and
    a plurality of elongated support rods supported by and extending upright from said slide body proximate the first location on the leg of the article of furniture, said plurality of elongated support rods also supporting said intermediate securement assembly and said upper securement assembly respectively proximate the second location and the third location on the leg of the article of furniture, said intermediate securement assembly including a plurality of collars having respective passageways receiving therethrough said elongated support rods for adjustable placement of said intermediate securement assembly along said elongated support rods.

12. The furniture slide assembly according to claim 11 wherein said slide body at a peripheral location has a tab with an aperture therethrough for attaching an elongated member to said slide body to facilitate towing said furniture slide assembly by the elongated member.

13. The furniture slide assembly according to claim 11 wherein said intermediate securement assembly includes:
   an elongated flexible strap having opposing first and second end portions extendible in opposite directions about the leg of the article of furniture at the second location; and
   first and second attachment devices respectively on said opposing first and second end portions of said elongated flexible strap and being interengageable with one another to detachably attach said opposing first and second end portions of said elongated flexible strap snugly about the leg at the second location.

14. The furniture slide assembly according to claim 13 wherein said first attachment device on said first end portion of said elongated flexible strap of said intermediate securement assembly includes a plurality of lugs extending laterally therefrom and spaced apart from one another therealong.

15. The furniture slide assembly according to claim 14 wherein said second attachment device on said second end portion of said elongated flexible strap of said intermediate securement assembly includes an aperture sized to receive said flexible strap first end portion therethrough and detachably attach with at least one of said lugs.

16. A furniture slide assembly selectively attachable to a leg of an article of furniture, said furniture slide assembly comprising:
   a slide body including
      an upper side for receiving and supporting the leg of the article of furniture at a first location on the leg, and
      a bottom side made of a material having a substantially low coefficient of friction for providing slidable contact on a support surface;
   an intermediate securement assembly detachably attachable about the leg of the article of furniture at a second location on the leg spaced above the first location;
   an upper securement assembly detachably attachable about the leg of the article of furniture at a third location on the leg spaced above the second location; and
   a plurality of elongated support rods supported by and extending upright from said slide body proximate the first location on the leg of the article of furniture, said plurality of elongated support rods also supporting said intermediate securement assembly and said upper securement assembly respectively proximate the second location and the third location on the leg of the article of furniture, said upper securement assembly including a plurality of brackets having respective passageways receiving therethrough said elongated support rods for predetermined placement of said upper securement assembly along said elongated support rods.

17. The furniture slide assembly according to claim 16 wherein said slide body at a peripheral location has a tab with an aperture therethrough for attaching an elongated member to said slide body to facilitate towing said furniture slide assembly by the elongated member.

18. The furniture slide assembly according to claim 16 wherein said upper securement assembly includes:
   an elongated flexible strap having opposing first and second end portions extendible in opposite directions about the leg of the article of furniture at the second location; and
   first and second attachment devices respectively on said opposing first and second end portions of said elongated flexible strap and being interengageable with one another to detachably attach said opposing first and second end portions of said elongated flexible strap snugly about the leg at the third location.

19. The furniture slide assembly according to claim 18 wherein said first attachment device on said first end portion of said elongated flexible strap of said upper securement assembly includes a length of loop segment of a hook and loop fastener.

20. The furniture slide assembly according to claim 19 wherein said second attachment device on said second end portion of said elongated flexible strap of said upper securement assembly includes a length of hook segment of a hook and loop fastener.

* * * * *